United States Patent [19]
Yamamoto et al.

[11] Patent Number: 5,853,061
[45] Date of Patent: Dec. 29, 1998

[54] SNOWMOBILE

[75] Inventors: Kazuhiro Yamamoto; Takao Kouchi, both of Saitama, Japan

[73] Assignee: Honda Giken Kogyo Kabushiki, Tokyo, Japan

[21] Appl. No.: 799,221

[22] Filed: Feb. 14, 1997

[30] Foreign Application Priority Data

Feb. 16, 1996 [JP] Japan ................................. 8-053759

[51] Int. Cl.⁶ ................................................ B62M 27/02
[52] U.S. Cl. ............................................ 180/190; 280/28
[58] Field of Search ..................................... 180/186, 190; 280/14.3, 21.1, 22, 22.1, 28.16, 28, 845; 441/65, 68

[56] References Cited

U.S. PATENT DOCUMENTS 3,252,533   5/1966   Aeder .
3,872,938   3/1975   DeGroot ................................. 180/185
5,474,146  12/1995   Yoshioka ................................ 180/184

FOREIGN PATENT DOCUMENTS 54-1721   1/1979   Japan .
3-189289  8/1991   Japan .

Primary Examiner—Douglas C. Butler
Assistant Examiner—C. T. Bartz
Attorney, Agent, or Firm—Birch, Stewart, Kolasch & Birch, LLP

[57] ABSTRACT

Variation in steering force is reduced by providing side edges attached to the right and the left side surfaces of a steering ski. The side edges have a continuously curved lower surface. A vertical plane including the axis of a pivot shaft crosses a middle portion of each side edge. Dislocation of contact centers from a pivot point, and the distances between the pivot point and the contact centers are small when the steering ski swings on the pivot shaft.

22 Claims, 6 Drawing Sheets

SNOWMOBILE

BACKGROUND OF THE INVENTION

1. Field of the Invention

The present invention relates to a snowmobile including a body, a steering ski suspended from a front portion of the body, and an engine-driven caterpillar unit suspended from a rear portion of the body.

2. Description of Background Art

Snowmobiles having a steering ski are disclosed in, for example, U.S. Pat. No. 3,252,533, Japanese Patent Laid-open No. Hei 3-189289 and Japanese Utility Model Publication No. Sho 54-1721.

Some of steering skis included in the known snowmobiles are provided with side edges and, generally, the lower surfaces of these side edges are straight.

FIG. 6 illustrates a prior art steering ski 1. Each of the side edges 12 are attached to the side surfaces of the steering ski 1 and include a straight lower surface. In FIG. 6, a front suspension 2 and a pivot shaft 6 are connected to the steering ski 1.

As is obvious from FIG. 6, when the steering ski 1 is provided with the side edges 12 each having the straight lower surface 12a, the position of the center of a contact portion of the lower surface 12a of the side edge 12 in contact with snow changes greatly between a front contact center F and a rear contact center R.

Consequently, a horizontal distance A between a pivotal point P and the front contact center F and a horizontal distance B between the pivotal point P and the rear contact center R change greatly. Thus, the steering force is caused to vary in a wide range. It is desirable to maintain the steering force constant.

SUMMARY AND OBJECTIONS OF THE INVENTION

According to the present invention, a snowmobile comprises a body, a steering ski suspended from a front portion of the body, and a caterpillar unit suspended from a rear portion of the body. The steering ski is provided on its side surfaces with side edges having a single or continuous curved surface.

According to the present invention, a pivot shaft supporting the steering ski is disposed above a middle portion of the side edges as viewed from the side.

According to the present invention, each of the side edges of the steering ski 1 is symmetrical with respect to its center axis as viewed from the side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 4:
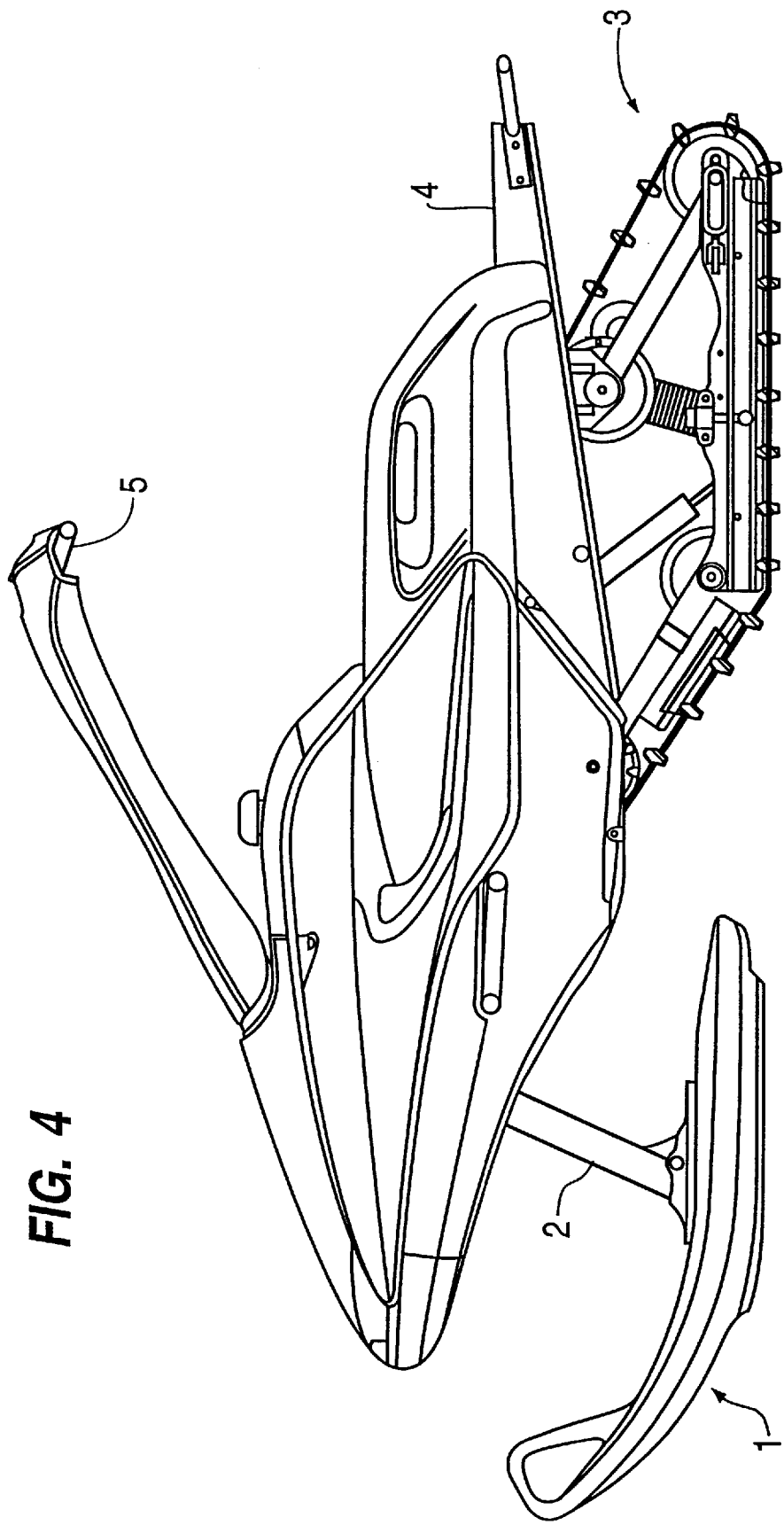
FIG. 4 is a side view of a snowmobile in a preferred embodiment according to the present invention.

Referring to FIG. 4, a snowmobile in a preferred embodiment according to the present invention is set forth wherein, a steering ski 1 is suspended by a front suspension 2 on a front portion of a body, and a caterpillar unit 3 is suspended on a rear portion of the body. The caterpillar unit 3 is driven by an engine, not shown.

A floor 4 extends over the caterpillar unit 3. A driver stands on the floor 4 and operates a steering bar 5. The steering bar 5 can be moved back and forth, and can be turned right and left to turn the front suspension 2 about an axis so that the steering ski 1 is turned for steering.

Figure 1:
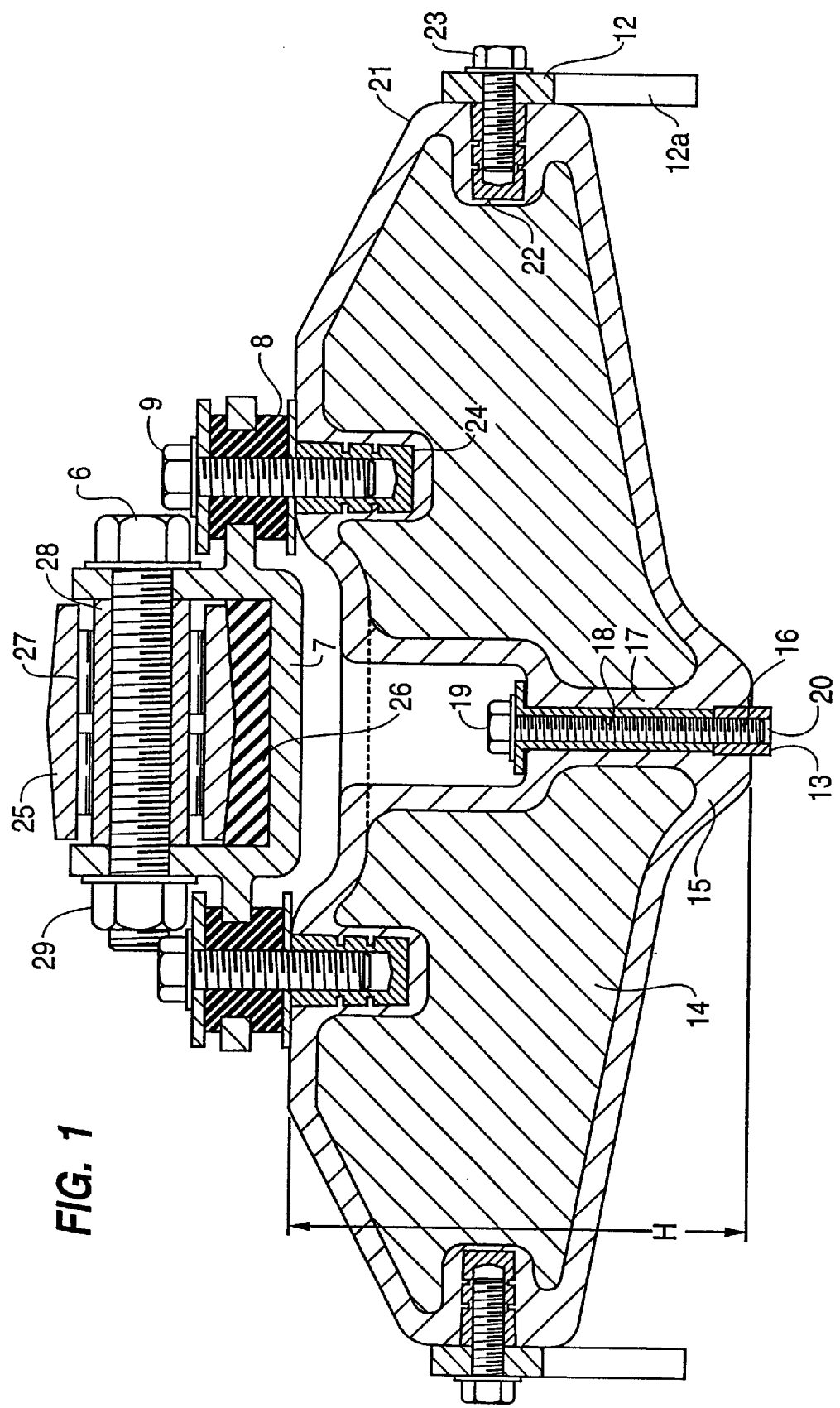
FIG. 1 is an enlarged sectional view taken along line 1—1 in FIG. 2.
Figure 2:
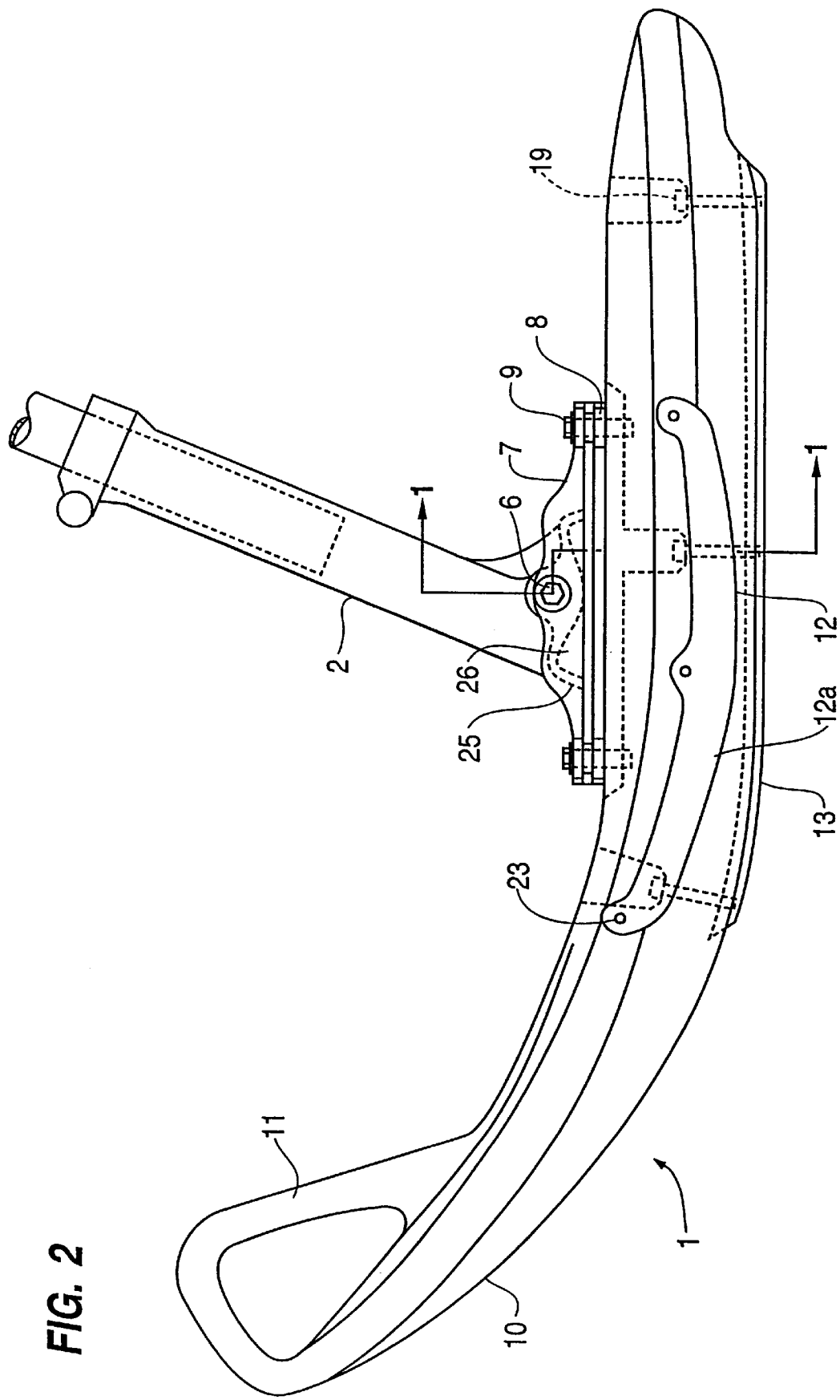
FIG. 2 is a side view of a steering ski.
Figure 3:
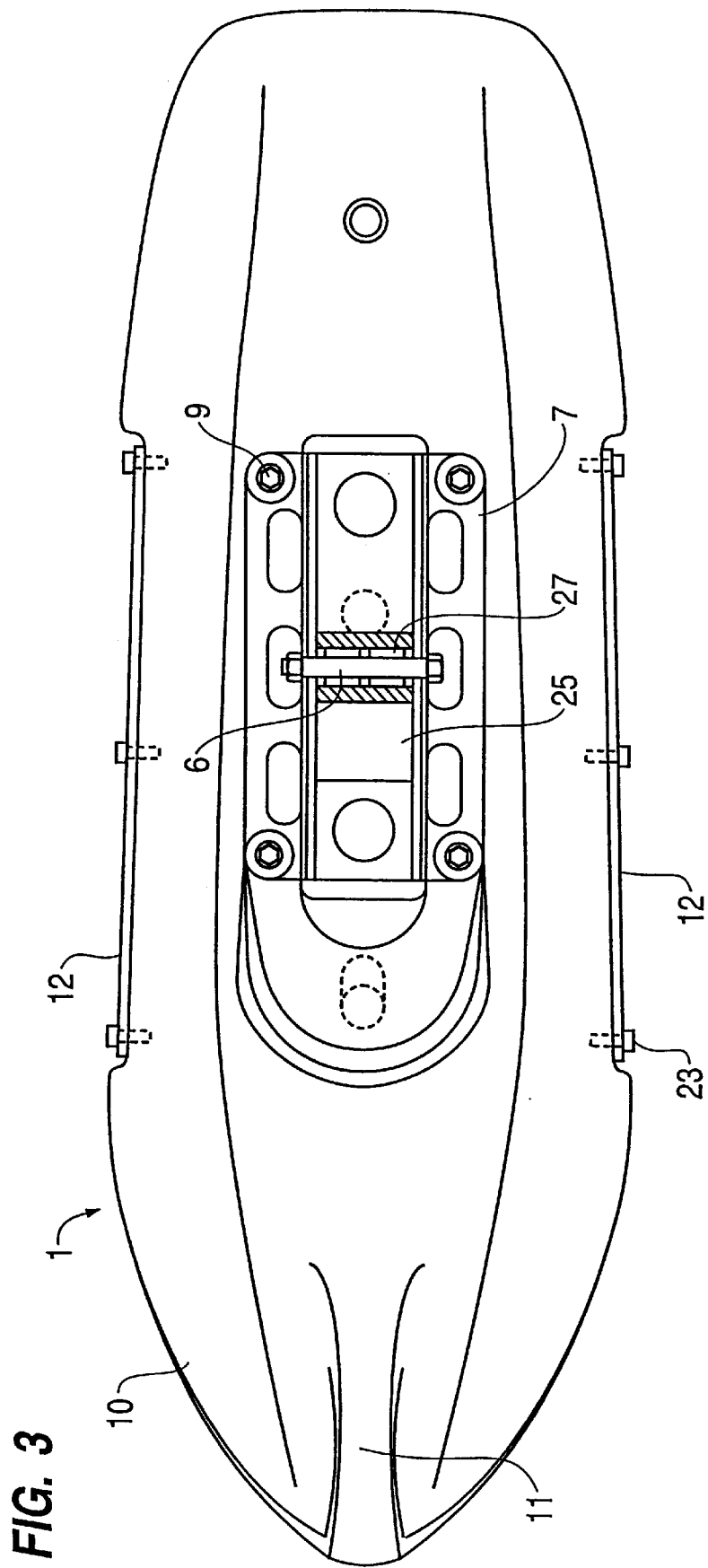
FIG. 3 is a plan view of a steering ski.

Referring to FIGS. 1 to 3, the steering ski 1 is a hollow structure having a closed cross section and is made of a polyethylene resin or a polypropylene resin (FIG. 1).

The front suspension 2 is of a known telescopic type. The lower end of the front suspension is pivotally joined to a ski bracket 7 by a pivot shaft 6.

The ski bracket 7 has a longitudinal elongated shape, vertical side walls, and a U-shaped cross section. The ski bracket 7 is mounted through rubber mounts 8 on a central portion of the upper wall of the steering ski 1 and is held in place with bolts 9.

As shown in FIG. 2, a front portion of the steering ski 1 is tapered toward the front to form a front cover portion 10. A grip 11 having the shape of a loop, as viewed laterally, is formed integrally with the middle portion of the front portion of the upper wall of the steering ski 1.

Side edges 12 constructed of metal are attached to the right and the left sides of a middle portion of the steering ski 1. A center edge 13 is attached to the central portion of the lower wall of the steering ski 1 so as to extend longitudinally.

As shown in FIG. 1, the hollow of the steering ski 1 is filled with a foam packing, such as a polyurethane foam packing 14 when necessary.

A longitudinal rib 15, provided with a longitudinal groove 16, is formed in the central portion of the bottom wall of the steering ski 1 so as to protrude downwardly from the outer surface of the bottom wall. The rib 15 is connected to a central portion of the upper wall by columnar vertical ribs 17.

The vertical ribs 17 are arranged at appropriate longitudinal intervals. Bolts 19 are inserted through bolt holes 18 formed in central portions of the vertical ribs 17. The bolts 19 are screwed in threaded holes 20 formed in the center edge 13 fitted in the longitudinal groove 16 to fasten the center edge member 13 to the longitudinal rib 15.

The center edge 13 may be incorporated into the steering ski 1 by insert molding. The opposite side portions of the bottom wall of the steering ski 1 extend outwardly from the longitudinal rib 15 so as to rise outwardly. Insert nuts 22 are buried in the side walls 21 and the side edges 12 are fastened to the side walls 21 by screwing bolts 23 in the insert nuts 22.

Insert nuts 24 are buried in the central portion of the upper wall of the steering ski 1, and bolts 9 are inserted through the rubber mounts 8 and are screwed in the insert nuts 24.

As shown in FIGS. 2 and 3, the lower end 25 of the front suspension 2 has a longitudinally elongated shape, and is provided with recesses in a front and a rear portion of the lower surface thereof. Pivot rubbers 26 are interposed between the lower end 25 and the ski bracket 7 so as to be received in the recesses formed in the lower surface of the lower end 25.

A bearing 27 is fitted in the lower end 25 and the pivot shaft 6 having the shape of a bolt is supported in the bearing 27. A collar 28 is inserted in the bearing 27 and the pivot shaft 6 is fastened to the collar 28 with a nut 29 screwed on a threaded portion of the pivot shaft 6.

Each side edge 12 has a monotonously continuous curved lower surface 12*a*. A vertical plane L including the axis of the pivot shaft 6 crosses a middle portion of each side edge 12.

The lower surface 12*a* of each side edge 12 may be any continuously curved surface and the curvature of the lower surface 12*a* may vary gradually from the front end toward the rear end of the lower surface 12*a*.

Figure 5:
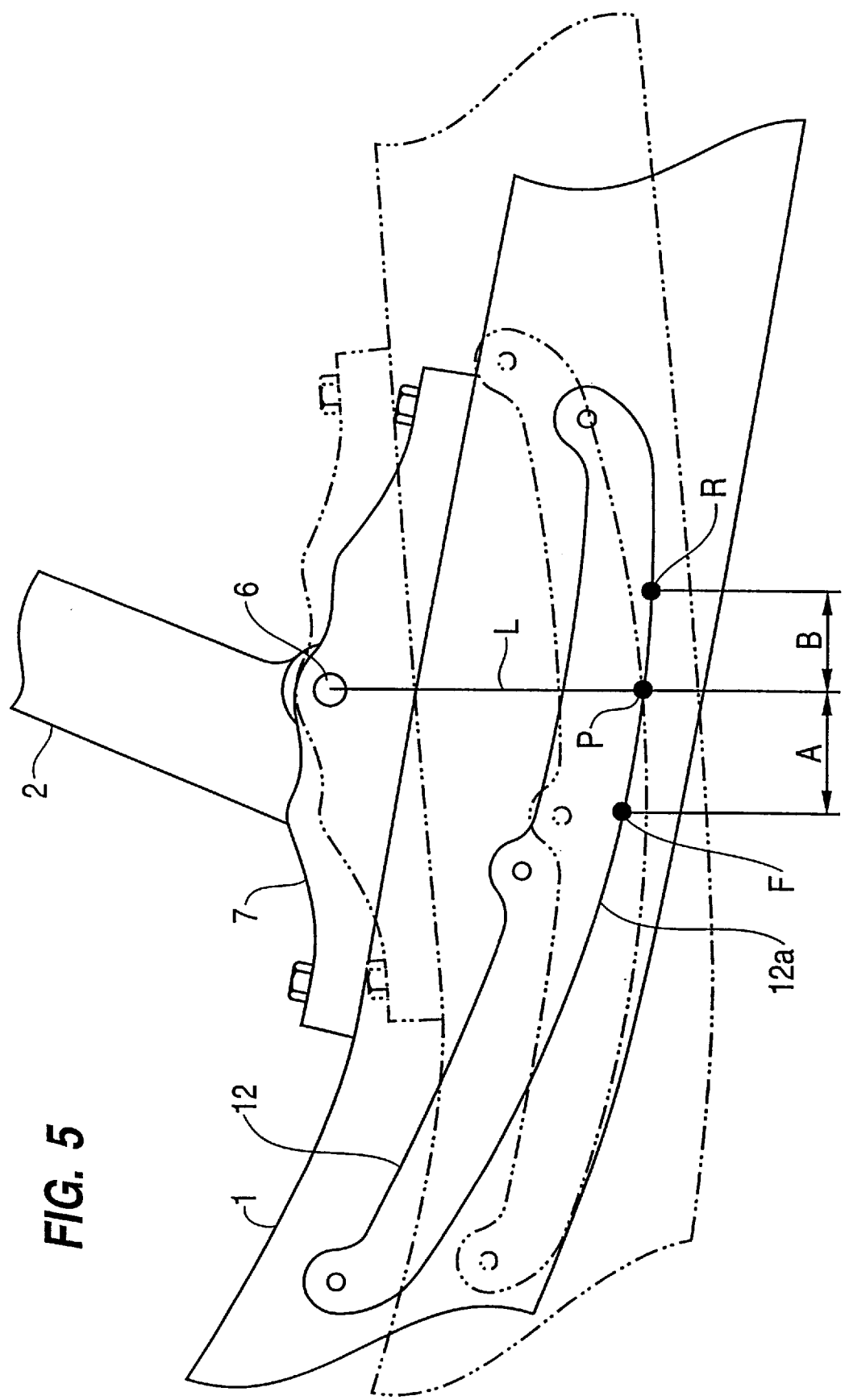
FIG. 5 is a diagrammatic view for explaining the function of the steering ski.
Figure 6:
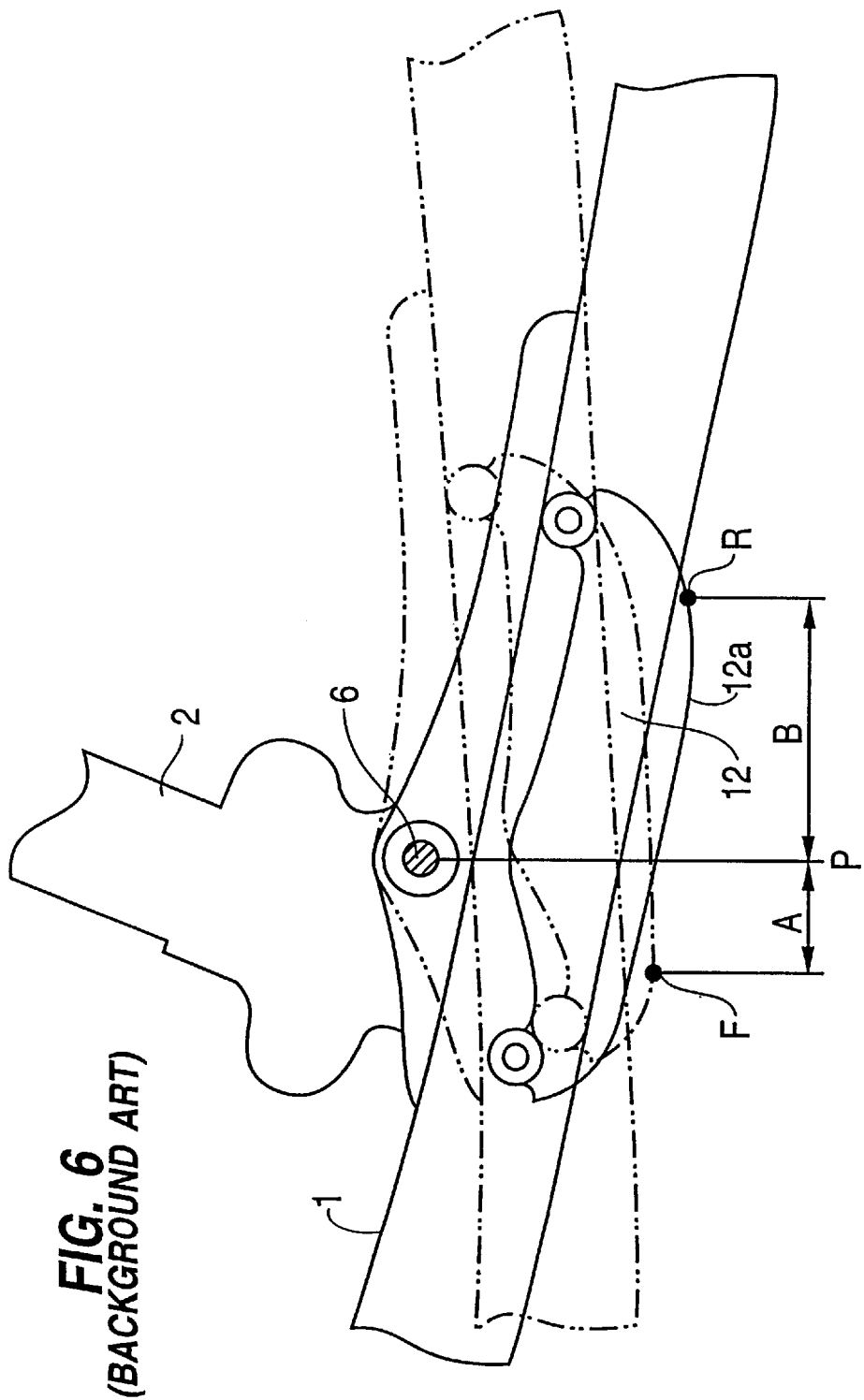
FIG. 6 is a diagrammatic view for explaining the function of a conventional steering ski.

FIG. 5 illustrates a contact center at point R which is behind a pivot point P when the steering ski 1 is tilted so that its front portion is raised as indicated by continuous lines. The contact center at point F is in front of the pivot point P when the steering ski 1 is tilted so that its front portion is lowered as indicated by alternate long and two short dashed lines.

Since the lower surface 12*a* is a substantially monotonous, continuous curved surface, the distance A between the pivot point P and the contact center F, and the distance B between the pivot point P and the contact center R are relatively short and obviously shorter than those in the conventional side edges for the same swing angle of the steering ski.

Therefore, even if the steering ski 1 swinging on the pivot shaft 6 changes in the position of the contact center of the continuously curved lower surface 12*a* of the side edge 12 the contact length of the same are small and hence the steering force does not change greatly.

When the pivot point P is at a position corresponding to the middle portion of the side edge 12, the contact centers F and R are located near the pivot point P so that changes in the steering force can further be reduced.

Since the side edges 12 are symmetrical with respect to a vertical line, the right and the left side edge 12 are interchangeable and the longitudinal direction of the side edges 12 may be inverted. Thus, the side edges 12 are compatible, which is advantageous to cost reduction and to facilitating assembling work. The locally abraded right and the left side edges 12 may be inverted to use unabraded portions of the same so that the life of the side edges is extended.

Since the lower surfaces of the side edges are monotonous or continuous curved surfaces, changes in the longitudinal position of the contact center and the contact length of the side edges are small and hence steering force remains constant.

Furthermore, when the side edges are designed so that the pivot point is located in a middle portion of the side edges, the position of the contact center varies in a narrow range around the pivot points, so that the variation of steering force can further be reduced.

Moreover, when the side edges are formed in a shape symmetrical with respect to a vertical line passing its middle point, the right and the left side edges are interchangeable and the enhancement of the compatibility of the parts is advantageous to cost reduction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A snowmobile comprising:
   a body including a front portion and a rear portion;
   a steering ski including side surfaces, said steering ski being suspended from said front portion of the body; and
   an engine driven caterpillar unit suspended from said rear portion of the body;
   wherein the side surfaces of the steering ski are provided with side edges having a continuously curved lower surface.

2. The snowmobile according to claim 1, wherein a pivot shaft supporting the steering ski is disposed above a middle portion of the side edges.

3. The snowmobile according to claim 1, wherein each of the side edges is symmetrical with respect to its center axis.

4. The snowmobile according to claim 1, and further including a center edge mounted below and extending a predetermined length beneath said steering ski.

5. The snowmobile according to claim 4, wherein said steering ski includes a longitudinal rib provided with a longitudinal groove, said center edge being mounted within said longitudinal groove.

6. The snowmobile according to claim 5, wherein said steering ski includes opposite side portions extending outwardly and upwardly from said longitudinal rib.

7. The snowmobile according to claim 1, wherein said side edges include a central portion, a first end and a second end, said first and second ends being continuously curved upwardly in a longitudinal direction from said central portion to form said continuously curved lower surface.

8. The snowmobile according to claim 7, wherein a right side edge is interchangeable with a left side edge when inverted and secured to a left side of said steering ski and a left side edge is interchangeable with a right side edge when inverted and secured to a right side of said steering ski.

9. The snowmobile according to claim 7, and further including apertures formed in said side edges for facilitating mounting of said side edges to said steering ski.

10. The snowmobile according to claim 9, wherein bolts mounted through said apertures in said side edges mate with insert nuts for retaining said side edges at a predetermined location on said steering ski.

11. A steering ski adapted to be used with a snowmobile having a body including a front portion and a rear portion and an engine driven caterpillar unit suspended from said rear portion of the body comprising:
    a steering ski including a front portion, a rear portion and side walls extending therebetween, said steering ski being adapted to be suspended from the front portion of the body; and
    side edges mounted on said side walls of the steering ski, said side edges having a continuously curved lower surface for reducing variations in a steering force.

12. The steering ski according to claim 11, and further including a pivot support for supporting the steering ski, said pivot support being disposed adjacent to a middle portion of the side walls.

13. The steering ski according to claim 11, wherein each of the side edges is symmetrical with respect to its center axis.

14. The steering ski according to claim 11, and further including a center edge mounted below and extending a predetermined length beneath said steering ski.

15. The steering ski according to claim 14, wherein said steering ski includes a longitudinal rib provided with a longitudinal groove, said center edge being mounted within said longitudinal groove.

16. The steering ski according to claim 15, wherein said steering ski includes opposite side portions extending outwardly and upwardly from said longitudinal rib.

17. The steering ski according to claim 11, wherein said side edges include a central portion, a first end and a second end, said first and second ends being continuously curved upwardly from said central portion to form said continuously curved lower surface, said side edges extending in a longitudinal direction.

18. The steering ski according to claim 17, wherein a right side edge is interchangeable with a left side edge when inverted and secured to a left side of said steering ski and a left side edge is interchangeable with a right side edge when inverted and secured to a right side of said steering ski.

19. The steering ski according to claim 17, and further including apertures formed in said side edges for facilitating mounting of said side edges to said steering ski.

20. The steering ski according to claim 19, wherein bolts mounted through said apertures in said side edges mate with insert nuts for retaining said side edges at a predetermined location on said steering ski.

21. The snowmobile according to claim 1, wherein the steering ski includes a hollow structure with a closed cross-section.

22. The steering ski according to claim 21, wherein the hollow structure includes a longitudinal rib formed therein, the longitudinal rib having a longitudinal groove formed therein, and a center edge mounted in the longitudinal groove.

* * * * *